March 9, 1937.  J. H. HOFFMANN  2,073,105
HEAT EXCHANGE APPARATUS
Filed Nov. 26, 1935
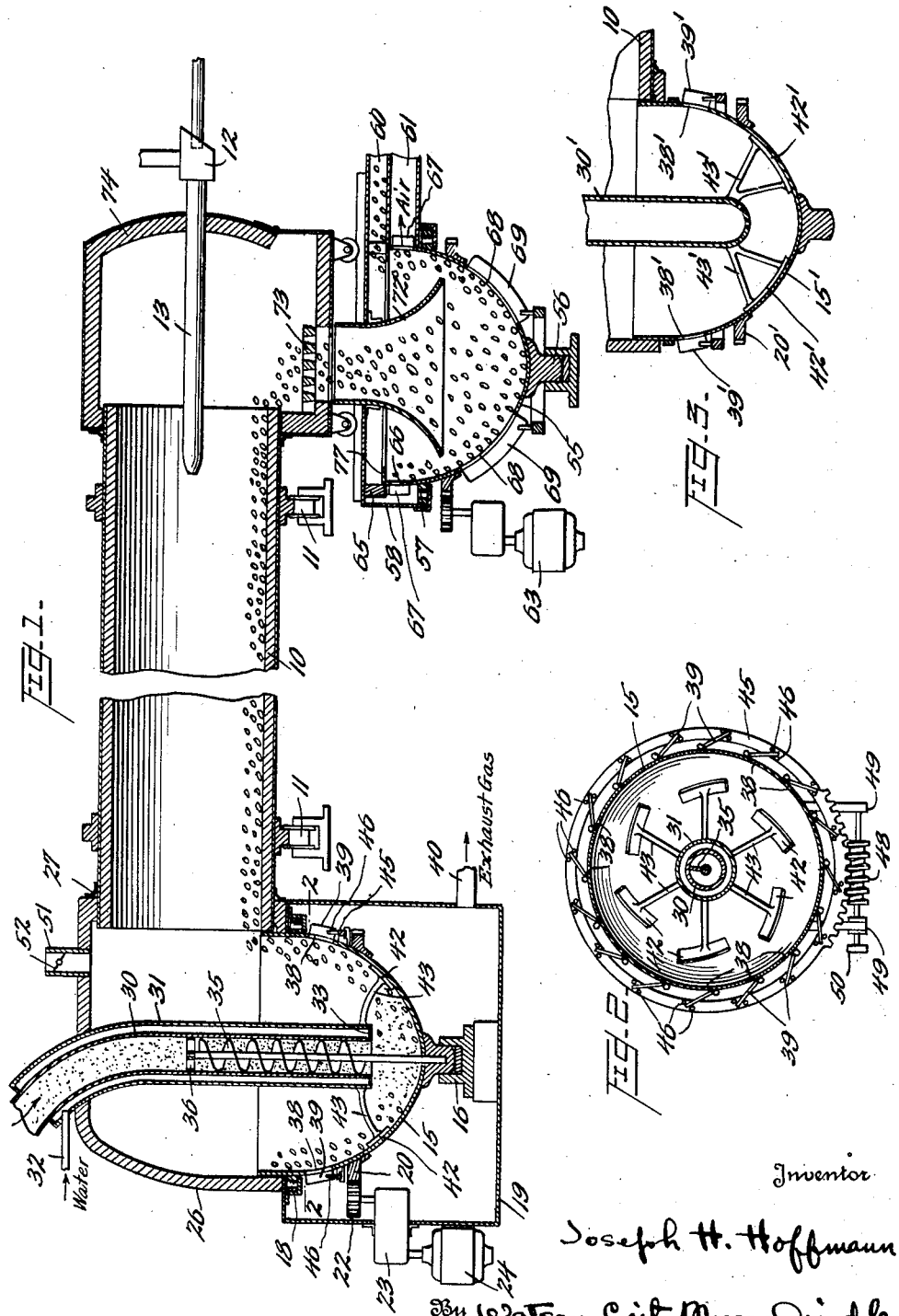

Patented Mar. 9, 1937

2,073,105

UNITED STATES PATENT OFFICE 2,073,105

HEAT EXCHANGE APPARATUS

Joseph H. Hoffmann, Bethlehem, Pa., assignor to G. Polysius Aktiengesellschaft, Dessau, Germany, a corporation of Germany Application November 26, 1935, Serial No. 51,671

19 Claims. (Cl. 263—32)

This invention relates primarily to apparatus for intimately contacting gaseous and solid material to effect a transfer of heat therebetween and is more particularly concerned with apparatus for the treatment of material initially produced in pulverulent form, for instance cement raw material.

It is the principal object of the invention to provide means whereby solid material in either pulverulent or agglomerated form may be displaced in predetermined generally upward paths by the action of centrifugal force, the rate of displacement being readily controllable, and whereby a gas may be caused to flow over and through the solid material while the latter is thus displaced.

In its more specific aspect the invention has two important applications, first to the formation of pulverulent solid material, initially either in the wet or dry condition, into nodular or agglomerated form, accompanied by heat exchange between the gas and the solid material, and second to the treatment of agglomerated material without substantial change of form for the purpose of effecting heat exchange only. For example, I may employ my apparatus for the treatment of cement raw material, which may be introduced into the apparatus either in the dry form or in the form of slurry, to effect agglomeration of the material into lumps or nodules, whereby more efficient burning of the material in a conventional kiln is made possible. The arrangement is preferably such that the agglomerated material is to some extent preburned before introduction into the kiln and the apparatus preferably discharges the agglomerated and preburned material directly into the kiln. Similar apparatus may be employed at the discharge end of the kiln for the cooling of cement clinker, in which case heat is transferred from the clinker to air or other cool gas, the structure being such as to effect cooling of the clinker to a fairly low temperature at a rapid rate as the result of flow of gas over and through the clinker in intimate and prolonged contact therewith. In the latter embodiment of the invention the air or gas which is heated by the clinker is conveyed in whole or in large part to the kiln for employment therein as secondary combustion air.

Further objects and features of the invention will be apparent from the following description taken in connection with the accompanying drawing, in which Figure 1 is a vertical section of a kiln for the burning of cement raw material having apparatus associated therewith for the treatment of the material prior to the delivery thereof to the kiln and for the cooling of the clinker discharged from the kiln;

Figure 2 is a horizontal sectional view taken substantially on the line 2—2 of Figure 1; and Figure 3 is a fragmentary sectional view corresponding to a portion of the structure employed at the inlet end of the kiln in Figure 1 and involving a modification thereof.

In order to facilitate an understanding of the invention, reference is made to the several embodiments thereof illustrated in the accompanying drawing and specific language is used. It will nevertheless be understood that no limitation of the scope of the invention is thereby intended and that such further alterations and modifications are contemplated as would occur to one skilled in the art.

For instance, while the invention is disclosed in connection with the conventional rotary type of kiln, it will be quite obvious that the apparatus may be associated with other types of kiln and may in fact be employed for purposes distinctly different from the treatment of cement material. In general the apparatus is susceptible of use for effecting exchange of heat between a solid and a gaseous material, the term "gas" being of course used in its ordinary sense to include air or any other fluid of a gaseous nature. The performance of functions other than heat exchange by my apparatus is also feasible as will appear from the following description; for instance, the formation of pulverulent material into nodules is an important function of this apparatus.

Referring now to Figure 1 of the drawing, it will be observed that a conventional rotary kiln is indicated at 10, this kiln being supported for rotation on suitable bearings 11 and being provided with the usual mixing chamber 12 which is arranged to deliver a combustible mixture through a nozzle 13 extending into the kiln, whereby the cement material passing through the kiln may be effectively burned. The application of the invention to the treatment of the cement raw material prior to introduction thereof into the kiln and shown at the left-hand end of Figure 1 will now be described.

This apparatus comprises as its essential element a rotating drum or bowl 15 which is supported on a conventional thrust bearing 16, the drum rotating about a generally upright axis; the axis of rotation of the drum 15 is preferably vertical, but under some circumstances may be inclined with respect to the vertical by as much as 40° or 50°, it being only essential that the open end of the drum be located substantially above the closed end thereof.

The drum is supported against lateral movement adjacent its upper end by means of an annular bearing 18, preferably of the anti-friction type, and this bearing may be supported in the upper end of a housing 19 encompassing the lower end of the drum. Rotation of the drum is preferably effected by means of an annular gear element 20 which is secured to the periphery of the drum and which meshes with a spur gear 22, the latter being in turn driven through reduction gearing (not shown) within a housing 23 which is rotated by a motor 24 or other source of power. Some conventional means is provided for varying the speed of rotation of the drum 15, either by control of the reduction gearing within the housing 23 or, preferably by control of the speed of the motor 24. The upper end of the housing 19 also affords a support for a casing 26 which is open at one side for communication with the inlet end of the kiln 10, suitable sealing means 27 being provided between the kiln and the casing, and which is open at its lower end for communication with the upper end of the drum 15, the latter being preferably received with minimum clearance within the casing 26. Sealing means may be provided to prevent the discharge of gas between the casing 26 and the drum 15 if necessary.

Extending through an opening in the upper part of the casing 26 is a conduit 30 which is preferably surrounded by a water jacket 31, water being introduced into the latter through a pipe 32 and being discharged from the lower end thereof through perforations 33 in the form of drops or fine spray. It will be observed that the conduit 30 extends to a point adjacent the lower end of the drum 15 and is provided with a screw conveyor or the like 35, the latter being suitably journalled at its upper end in a bracket 36 supported within the conduit 30 and being secured at its lower end to the support for the drum 15 so that the conveyor is thus caused to rotate with the drum. If cement raw material or the like is introduced in the upper end of the conduit 30, it will be fed downwardly in measured quantity in accordance with the speed of rotation of the drum 15 into the lower end of the latter. Water is simultaneously delivered through the water jacket 31 which thus serves not only to protect the conduit 30 against the action of the hot gases discharging from the inlet end of the kiln 10, but also serves to moisten the raw material at the bottom of the drum 15 so that the latter may be agglomerated, the material building up around the drops of water into nodular form.

By reason of rotation of the drum 15, the small nodules formed beneath the conduit 30 gradually increase in size, the action of centrifugal force urging these nodules outwardly and the resultant rolling action assisting in the accumulation of additional material about the original moistened nodule so that the building up of nodules of substantial size is facilitated. The heavier and more completely formed nodules move upwardly in the drum under the action of centrifugal force and are discharged at the upper end of the drum into the kiln 10 which affords the only outlet for the nodules. Nodules which are incompletely formed are of less weight and are not displaced from the drum 15 until they have been built up to a suitable size. Thus the apparatus serves to deliver to the kiln nodules which are of generally uniform size and which are sufficiently large to promote intimate contact within the kiln between the cement material and the hot combustion gases, it having been clearly demonstrated that the rapidity of operation of cement kilns and the uniformity of the resultant product is aided to a very considerable extent by the introduction of the material in fairly large agglomerates of uniform size.

The operations carried out in the drum 15 are also facilitated by the circulation of the hot kiln gases therein, these gases passing downwardly in the casing 26 and into the drum 15 where they circulate in intimate contact with the material therein, being discharged through apertures 38 in the drum periphery with which are preferably associated vanes 39, the latter being secured to the external periphery of the drum and being so directed that on rotation of the drum there is a forced discharge of the hot gases through the apertures 38. It will of course be appreciated that the size of the apertures 38 is such as to prevent discharge of the cement material therethrough, the apertures being located near the upper portion of the drum 15 where as the result of the selective action of centrifugal force, the material is in the form of agglomerates of appreciable size. The passage of the hot kiln gases over and through the agglomerates or nodules not only serves to dry and harden the latter so that they will be less likely to break up on passing through the kiln, but actually preburns or precalcines the nodules to some extent so that the length of time required for the complete burning of the nodules in the kiln may be reduced and the length of the kiln thereby materially shortened. It has been found that this preburning of the material can be satisfactorily carried out only if the hot gases are passed entirely through the material as distinguished from passage of the gases over the surface only of a layer of material. The gases discharged from the apertures 38, having been considerably reduced in temperature by transfer of heat to the nodules of raw material, may be vented from the housing 19 through an exhaust gas passage 40 and employed for any suitable purpose.

It is important to note that the vanes 39 are supported for adjustment so that the flow of gas through the material may be controlled. This adjustment may be effected in any convenient manner and the details of the structure for effecting the adjustment form no essential part of the invention. For example, as shown more particularly in Figures 1 and 2, an annular toothed element 45, supported on the drum for limited rotative movement with respect thereto, may be provided with pins 46 disposed on either side of each vane. An element 48 having a worm thread or the like thereon meshing with the toothed portion of the element 45 is supported for rotation on its axis in a suitable bearing 49 carried by the drum. Each of the vanes is hingedly supported on the drum and may thus be swung toward or away from the drum to a greater or less extent as the toothed element 45 is rotated by the rotation of the element 48 on its axis, the latter being supplied with a handle 50 whereby the desired adjustment may be accurately effected. Any other means for regulating the angular disposition of the vanes or otherwise controlling the action thereof so as to vary the flow of gas through the material may be employed.

The control of gas flow in the manner just described permits accurate regulation of the effect of the hot gases on the material both in the drying and agglomeration of the material and in the preburning thereof, and the nodules may be thus precalcined to any extent found desirable, suitable adjustment being made to take care of varying operating conditions. In order that this control may be effected independently of the volume of gas moving through the kiln, it may be desirable to provide an auxiliary vent 51, in the casing 26, this vent being controlled by a valve 52. By means of this valve the apparatus may be adjusted to decrease the quantity of gas flowing through the material without decreasing the total flow of gas through the kiln, the valve 52 being opened to the extent necessary to permit the venting of excess kiln gas.

In order that the moistened raw material may not adhere to the wall of the drum, and in order to facilitate upward movement of the material in the lower portion of the drum, blades or scrapers 42 engaging the inner periphery of the drum and supported on a spider structure 43 carried at the lower end of the conduit 30 and water jacket 31 may be provided. It will be understood that the blades 42 engage or approach in close proximity to the inner wall of the drum 15 and are inclined in a circumferential direction so that the trailing ends thereof are above the leading ends, as measured in the direction of rotation of the drum, whereby the desired upward component of movement is imparted to the material and the action of centrifugal force in displacing the material is augmented.

It is obvious that by variation of the speed of rotation of the drum, the rate of discharge of the nodules therefrom may be regulated as desired, and thus the extent to which the nodules are preburned and the amount of material fed to the kiln in a given period of time may be controlled with reasonable accuracy.

Figure 3 of the drawing illustrates a modified construction, similar in structure and function generally to that shown in Figure 1, but designed for the treatment of cement raw material in the form of slurry. The slurry is introduced through a conduit 30' into the lower end of the drum 15' which is supported for rotation about an upstanding axis by means of suitable bearings, rotation being effected through an annular gear 20'. Secured to the lower end of the conduit 30' is a spider structure 43' on which are carried blades or scrapers 42', the latter engaging the interior of the drum 15' to prevent the adherence of the wet material thereto and being inclined upwardly in the direction of rotation of the drum to forward the material in an upward direction. The hot kiln gases are discharged into the drum 15', being caused to circulate therein and to discharge through apertures 38', the discharge being facilitated by means of vanes 39', which are suitably directed to force the gases outwardly through the apertures, these vanes being supported for adjustment to vary the effectiveness thereof for the purpose hereinbefore outlined. The conduit 30' is preferably closed at its lower end and provided with apertures 37, the slurry being sprayed or squirted through the apertures 37, pressure being applied to the slurry within the conduit, if necessary, to facilitate this action.

By reason of the rotation of the drum and the action of the hot gases, the slurry is partially dried and at the same time gradually formed into agglomerates, the latter being discharged upwardly through the open end of the drum 15' by centrifugal force, the larger and completely formed agglomerates being first discharged. Partial burning of the agglomerates is preferably effected before delivery to the kiln.

Reference is now made to the arrangement shown at the right-hand end of Figure 1 which, as will be observed, is quite similar in structure to the apparatus hereinbefore described. Thus this apparatus comprises a drum 55 supported for rotation about a generally upstanding axis by means of a thrust bearing 56 and an annular bearing 57, the latter being supported in the lower end of a casing 58 which is in communication with the upper open end of the drum 55 and which may be formed to provide material and air discharge passages indicated at 60 and 61 respectively. The drum 55 may be rotated through gearing from a source of motive power 63 at a readily controllable rate.

An annular element 65 carried by the upper portion of the casing 58 surrounds and is disposed in close proximity to the upper end of the drum 55, the annular element 65 being open adjacent the material discharge passage 60 only, whereby any discharge of material must take place through the passage. Adjacent its upper end the drum 55 may be provided with apertures 66 which are spaced circumferentially thereof, adjustable vanes 67 similar to the vanes 39 as illustrated in Figures 1 and 2 being preferably associated with such apertures so as to tend to draw air out of the upper end of the drum 55 and into the casing 58, from which it is discharged through the passage 61.

Adjacent its lower end the drum 55 is provided with circumferentially disposed apertures 68 with which are associated similarly adjustable vanes 69, the latter being so directed with respect to the direction of rotation of the drum as to force air through the apertures 68 and into the drum. The major portion of the air thus delivered into the drum will flow upwardly through an inverted generally bell-shaped member 72, supported by the casing 58, and through a grate 73 in the lower side of a conventional housing 74 at the discharge end of the kiln and thence into the kiln where it acts as a secondary combustion air. It will be observed that the member 72 is so formed that a smaller quantity of air passes upward along the walls of the drum 55 and is discharged through the passage 61 as hereinbefore explained.

The clinker discharged from the end of the kiln 10 falls through the grate 73 and through the member 72 into the lower end of the drum 55 where it is intimately contacted with the cool air flowing through the apertures 68, the air passing directly through the clinker. As the drum 55 rotates the clinker will move upwardly along the walls of the drum past the lower end of the member 72 and a certain proportion of the air will move through and in the direction of upward displacement of the clinker by reason of the action of the vanes 67. It will therefore be appreciated that the arrangement ensures not only the passage of all the air entering the drum 55 through the clinker but actually effects movement of air through and in the direction of the layer of clinker which rests on the walls of the drum 55 during upward displacement of the clinker. Very efficient cooling is thereby effected and the clinker is reduced rapidly to a temperature suitable for further treatment.

Incidentally, this rapid cooling or quenching of the clinker is an important feature of the invention, it having been found that owing to some structural change within the clinker resulting from extremely rapid cooling, the subsequent pulverizing of the clinker may be much more readily performed with a corresponding saving in the expense of this operation and with the result that a more uniform product is obtained. In order to prevent too rapid discharge of clinker from the drum 55, an annular baffle member 77 may be formed at the upper end of the drum. Thus a substantial layer of material is always maintained on the wall of the drum adjacent the upper end of the latter so that extended contact between the cooling air discharging through the passage 61 and the clinker is ensured, adequate cooling of the walls of the drum to protect the same being also thereby effected.

In the embodiment of the invention just described, the angular adjustment of the vanes 67 and 69 is a matter of very considerable importance. Thus the primary effect of the adjustment of the vanes 69 is the regulation of the quantity of secondary air entering the kiln, although the extent to which the clinker is cooled is also thereby controlled in some degree. However, the principal control of the clinker temperature is effected by adjustment of the vanes 67 since the air discharged through the aperture 66 is first caused to pass lengthwise through the layer of material on the wall of the drum 55 and thus affords the principal medium for reducing the clinker temperature. By proper adjustment of the vanes 67 and 69, and the speed of rotation of the drum 55, whereby the rate of discharge of clinker may be controlled, the function of the apparatus may be readily regulated so as to satisfy wide variations in operating conditions and to meet any practical requirements.

Having thus described the invention, what is claimed as new and desired to be secured by Letters Patent is:

1. In heat exchange apparatus, the combination with a drum supported for rotation about a generally upright axis, of means for introducing solid material into the lower portion of said drum for upward displacement along the walls of the drum in response to centrifugal force, means causing circulation of gas in said drum in contact with said solid material during displacement of the latter, and a material discharge outlet at the upper end of said drum.

2. In heat exchange apparatus, the combination with a drum supported for rotation about a generally upright axis, of means for introducing solid material into the lower portion of said drum for upward displacement along the walls of the drum in response to centrifugal force, the walls of said drum being pervious to gas, means causing gas to flow through the drum walls and the material thereon, and a material discharge outlet at the upper end of said drum.

3. In heat exchange apparatus, the combination with a drum supported for rotation about a generally upright axis, of means for introducing solid material into the lower portion of said drum for upward displacement along the walls of the drum in response to centrifugal force, the walls of said drum being pervious to gas, means causing gas to flow through the drum walls and the material thereon, said last named means being adjustable to regulate the rate of gaseous flow through the material, and a material discharge outlet at the upper end of said drum.

4. In heat exchange apparatus, the combination with a drum supported for rotation about a substantially vertical axis, of means for introducing solid material into the lower portion of said drum for upward displacement along the walls of the drum in response to centrifugal force, means causing circulation of gas in said drum in contact with said solid material during displacement of the latter, a material discharge outlet at the upper end of said drum, and means for rotating said drum at a variable rate, whereby the rate of discharge of material from said drum may be controlled.

5. In heat exchange apparatus for effecting contact of gas and solid material, the combination with a generally bowl-shaped drum having the upper end thereof open, means supporting said drum for rotation about a generally vertical axis, means for introducing solid material into the lower end of the drum for outward and upward displacement therein under the action of centrifugal force and for discharge from said drum at the upper open end thereof, said drum having a portion apertured for the passage of gas only therethrough, means for passing gas through the material and the apertured portion of the drum to effect exchange of heat between the material and the gas, adjustable vanes associated with the apertured portion of the drum and rotatable therewith for forcing gas through the material at a controllable rate of flow, and means for rotating said drum at a variable speed to regulate the rate of displacement in and of discharge of material from said drum.

6. In apparatus for agglomerating cement raw material prior to introduction thereof in a kiln, the combination with a drum supported for rotation about a generally upright axis, of means for the introduction of the material in substantially dry form into the drum, means for discharging liquid on the material in the drum to moisten the same and permit the agglomeration of the material into nodular form, means to direct hot gas into said drum and through the material therein, and means for rotating said drum at a rate sufficient to effect centrifugal outward and upward displacement of the material.

7. In apparatus for agglomerating cement raw material prior to introduction thereof in a kiln, the combination with a drum supported for rotation about a generally upright axis, of means for the introduction of the material in substantially dry form into the drum, means for discharging liquid on the material in the drum to moisten the same and permit the agglomeration of the material into nodular form, said drum having a perforated portion for the passage of gas therethrough, means for rotating said drum at a rate sufficient to urge the material outwardly and upwardly of the drum and across the perforated portion of the drum by centrifugal force, and means for directing hot kiln exhaust gas into the drum, through the material, and through the perforated portion of the drum to partially burn the material.

8. In apparatus for agglomerating cement raw material prior to introduction thereof in a kiln, the combination with a drum supported for rotation about a generally upright axis, of means for the introduction of the material in substantially dry form into the drum, means for discharging liquid on the material in the drum to moisten the same and permit the agglomeration of the material into nodular form, means to direct hot gas into said drum and through the material therein, means for rotating said drum at a rate sufficient to effect centrifugal outward and upward displacement of the material, and stationary means within said drum disposed in close proximity to the drum wall to remove material therefrom, said last named means being so formed and directed as to assist in upward displacement of the material.

9. In apparatus for agglomerating cement raw material prior to introduction thereof in a kiln, the combination with a drum supported for rotation about a generally upright axis, of means for the introduction of the material in substantially dry form into the drum, means for discharging liquid on the material in the drum to moisten the same and permit the agglomeration of the material into nodular form, means to direct hot gas into said drum and through the material therein, adjustable means associated with said drum for regulating the rate of flow of hot gas through the material, and means for rotating said drum at a rate sufficient to effect centrifugal outward and upward displacement of the material.

10. In apparatus for agglomerating cement raw material prior to introduction thereof in a kiln, the combination with a drum supported for rotation about a generally upright axis, of means for the introduction of the material in substantially dry form into the drum, said means including a conveyor member rotatable with said drum, means for discharging liquid on the material in the drum to moisten the same and permit the agglomeration of the material into nodular form, means to direct hot gas into said drum and through the material therein, and means for rotating said drum at a rate sufficient to effect centrifugal outward and upward displacement of the material.

11. In apparatus for agglomerating cement raw material prior to introduction thereof in a kiln, the combination with a drum supported for rotation about a generally upright axis, of means for the introduction of the material in substantially dry form into the drum, means for discharging liquid on the material in the drum to moisten the same and permit the agglomeration of the material into nodular form, said drum having a perforated portion for the passage of gas therethrough, means for rotating said drum at a rate sufficient to urge the material outwardly and upwardly of the drum and across the perforated portion of the drum by centrifugal force, means for directing hot kiln exhaust gas into the drum, through the material, and through the perforated portion of the drum to partially burn the material, and a material discharge outlet associated with the upper portion of the drum and affording direct communication with the kiln.

12. In apparatus for agglomerating cement raw material prior to introduction thereof in a kiln, the combination with a drum supported for rotation about a generally upright axis, of means for the introduction of the material in substantially dry form into the drum, said means comprising a conduit extending into the drum, a water jacket surrounding said conduit to reduce the temperature of the latter and to deliver water to the material in the drum, whereby agglomeration of the material may be effected, means to direct hot gas into said drum and through the material therein, and means for rotating said drum at a rate sufficient to effect centrifugal outward and upward displacement of the material.

13. In apparatus for agglomerating cement raw material prior to introduction thereof in a kiln, the combination with a drum supported for rotation about a generally upright axis, of means for introducing cement material in the form of slurry into said drum, said drum having a perforated portion, means for directing hot kiln gases into said drum and through the material, and the perforated portion of the drum, and means for rotating the drum to urge the material upwardly and outwardly and across the perforated portion of the drum to agglomerate, dry, and preheat the material.

14. In apparatus for cooling cement clinker as it discharges from a kiln, the combination with a drum, of means for delivering cement clinker to said drum, means for passing air into said drum and through the clinker to quench the latter, means delivering the major portion of the air to said kiln for use as pre-heated combustion air, means for displacing the clinker along the wall of the drum toward the discharge end thereof, and means for diverting a portion of the air to cause the same to flow along the wall of the drum through the clinker as the latter is displaced.

15. In apparatus for cooling cement clinker as it discharges from a kiln, the combination with a drum of means for delivering cement clinker to said drum, means for passing air into said drum and through the clinker to quench the latter, means delivering the major portion of the air to said kiln for use as preheated combustion air, means for displacing the clinker along the wall of the drum toward the discharge end thereof, means for diverting a portion of the air to cause the same to flow along the wall of the drum through the clinker as the latter is displaced, and means for separately regulating the quantity of air passed into the drum and the quantity of air so diverted.

16. In apparatus for cooling cement clinker as it discharges from a kiln, the combination with a drum supported for rotation about a generally upstanding axis, of means for delivering cement clinker to said drum, means for passing air into said drum and through the clinker to quench the latter, means delivering the major portion of the air to said kiln for use as preheated combustion air, means for displacing the clinker along the wall of the drum toward the discharge end thereof, said last named means comprising mechanism for rotating said drum at a rate sufficient to move the clinker outwardly and upwardly of the drum by the action of centrifugal force, and means for diverting a portion of the air to cause the same to flow along the wall of the drum through the clinker as the latter is displaced.

17. In apparatus for cooling cement clinker as it discharges from a kiln, the combination with a drum supported for rotation about a generally upstanding axis, of means for delivering cement clinker to said drum, means for passing air into said drum and through the clinker to quench the latter, means delivering the major portion of the air to said kiln for use as preheated combustion air, means for displacing the clinker along the wall of the drum toward the discharge end thereof, said last named means comprising mechanism for rotating said drum at a rate sufficient to move the clinker outwardly and upwardly of the drum by the action of centrifugal force, means for diverting a portion of the air to cause the same to flow along the wall of the drum through the clinker as the latter is displaced, and means for separately regulating the quantity of air passed into the drum and the quantity of air so diverted.

18. In apparatus for cooling cement clinker as it discharges from a kiln, the combination with a drum supported for rotation about a generally upstanding axis, of means for delivering cement clinker to said drum, means for passing air into said drum and through the clinker to quench the latter, means delivering the major portion of the air to said kiln for use as preheated combustion air, means for displacing the clinker along the wall of the drum toward the discharge end thereof, said last named means comprising mechanism for rotating said drum at a rate sufficient to move the clinker outwardly and upwardly of the drum by the action of centrifugal force, means for diverting a portion of the air to cause the same to flow along the wall of the drum through the clinker as the latter is displaced, and baffle means for retarding discharge of clinker from the drum to prolong the period of cooling thereof.

19. In apparatus for cooling cement clinker as it discharges from a kiln, the combination with a drum, of means for delivering cement clinker to said drum, means for passing air into said drum and through the clinker to quench the latter, means delivering the major portion of the air to said kiln for use as preheated combustion air, means for displacing the clinker along the wall of the drum toward the discharge end thereof, means for diverting a portion of the air to cause the same to flow along the wall of the drum through the clinker as the latter is displaced, and means for regulating the quantity of air thus diverted.

JOSEPH H. HOFFMANN.